(12) United States Patent
Chang

(10) Patent No.: US 6,278,558 B1
(45) Date of Patent: Aug. 21, 2001

(54) TRANSVERSE ZOOM LENS SET

(76) Inventor: Rong-Seng Chang, 6F, No. 30, Lane 81, Sec. 7, Chung-shan N. Rd., Taipei (TW)

( * ) Notice: Subject to any disclaimer, the term of this patent is extended or adjusted under 35 U.S.C. 154(b) by 0 days.

(21) Appl. No.: 09/398,971

(22) Filed: Sep. 17, 1999

(51) Int. Cl.⁷ .................................................. G02B 15/14
(52) U.S. Cl. ........................... 359/676; 359/677; 359/683
(58) Field of Search ................................... 359/676, 677, 359/678, 683, 684

(56) References Cited

U.S. PATENT DOCUMENTS 3,583,790 * 6/1971 Baker ..................................... 350/184
4,650,292 * 3/1987 Baker et al. .......................... 350/432
4,925,281 * 5/1990 Baker ..................................... 350/423

* cited by examiner

Primary Examiner—Georgia Epps
Assistant Examiner—Tim Thompson

(57) ABSTRACT

A zoom lens set with a fixed distance between lenses comprises at least one gradually changed curvature lens. The surface with a gradually changed curvature surfaces is locally limited by a suitable size pupil along an optical axis. In assembling, gradually changed curvature lenses are installed within a system so that the two lenses are retained within a fixed distance. Thereby, the or more gradually changed curvature lenses are adjusted and chosen by a local pupil to have a desired local curvature pairs or sets by relative transverse movement or rotation of the two or more lenses. Therefore, the focus of the system is changed to achieve the zooming purposed. By a simple design, the system can be completely matched with the zoom lens set with a fixed distance between the lenses so that the manufacturing cost of the system can be reduced effectively.

1 Claim, 2 Drawing Sheets

TRANSVERSE ZOOM LENS SET

BACKGROUND OF THE INVENTION

1. Field of the Invention

The present invention relates to a transverse zooming lens set, and especially to a zooming lens set in which the focus change is performed without adjusting the longitudinal (optical axis) direction distance between lenses in the lens set.

2. Description of the Prior Art

In current camera, telescope and other photo lens systems, a zooming lens set can be adjusted to make the object being imaged appear gradually bigger or smaller so that it seems to be getting steadily closer or more distant. In these devices, by longitudinal movement of the lenses along the optical axis, the focus is changed for making up the images in different sizes. Changing focus is to adjust the distance between lenses or lens sets by moving the lenses or lens sets along the optical axis. However, the traditional way of changing focus is very difficult and complicated. One primary reason is that the relation between the track of the lenses with respect to the focus is nonlinear. Thus, a very precise guiding track (cam) is necessary for adjusting the relative distance between the lens sets. There are optic problems as well as mechanical difficulty in manufacturing a complete lens set with variable focus.

SUMMARY OF THE INVENTION

Accordingly, the primary object of the present invention is to provide a zooming lens set with a fixed distance between lenses comprising at least one gradually changed curvature. Each of the lenses may include different gradually changed curvatures. Each curvature may have a gradient radius. In assembling, the gradually changed curvature lens or gradually changed curvature lens sets are installed within a system so that the lenses are retained within a fixed distance. Thereby, the gradually changed curvature lens on lenses may be adjusted to have a desired curvature by relative movement in the transverse direction to the optical axis or rotation in the vertical plane to the optical axis so that the focus of the system is changed.

DESCRIPTION OF THE PREFERRED EMBODIMENT

Figure 1:
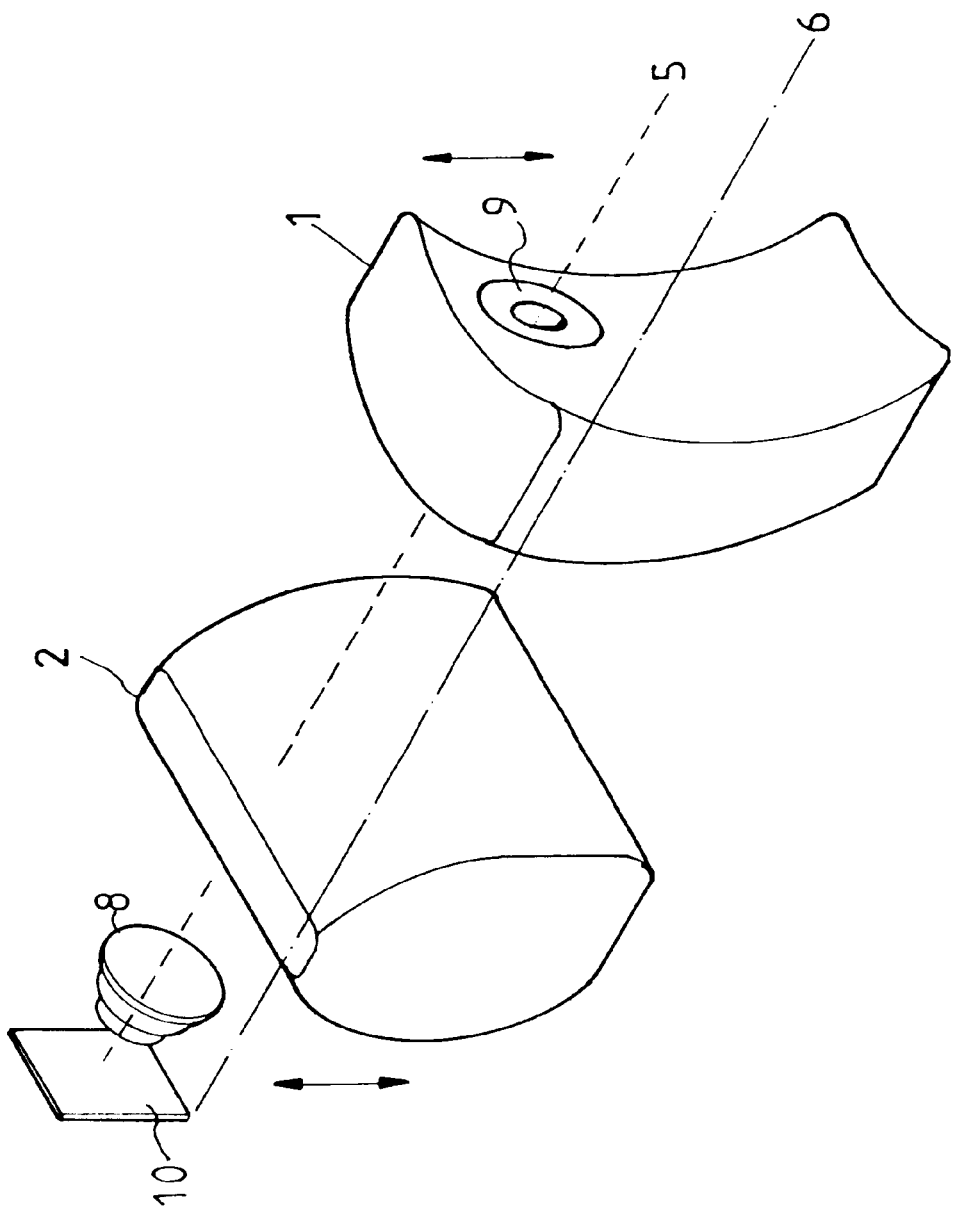
FIG. 1 is a perspective view showing the transversely movable type zooming lens set with a fixed distance between lenses of the present invention.

With reference to FIG. 1, a perspective view of a transversely movable zooming lens set with a fixed lens distance is illustrated. The lens set includes a transverse gradually changed curvature lens 1 and a transverse gradually changed curvature lens 2. The numbers of the lens 1 and lens 2 are not confined to one. They may be more than one. The mechanical axis 6 shown in the figure is the center of the lens 1 and lens 2. The transverse gradually changed curvature lens 1 and/or lens 2 has gradually changed radiuses of curvatures for one surface or two surfaces of the lens. The design of the gradient surfaces of the lenses is in such a way that those surfaces should cancel the aberrations of one another by their local corresponding gradually changed curvature surfaces when the surface area is locally limited near the optical axis by a small suitable size pupil 9 and the other optical surfaces in the optical system. In assembly, the transverse gradually changed curvature lens 1 and the transverse gradually changed curvature lens 2 are assembled within a system (not shown), for example, a camera, a telescope, etc. and retained with a predetermined distance therebetween. In using, by moving upwards and downwards, the transverse gradually changed curvature lens 1 and the transverse gradually changed curvature lens 2, different radiuses of curvatures near the optical axis limited by the pupil 9 are selected as shown by the arrows in the figure. When the transverse gradually changed curvature lens 1 and transverse gradually changed curvature lens 2 are moved, they are positioned in such a way that radius of curvature near the optical axis of lens 1 with respect to that of the curvature 2 will result in forming an image of a desired magnification. When the focus is changed, the image of in object is in a fixed image plane so that the purpose of changing image size is achieved. The aforesaid optical axis 5 is an axis for forming an image. A film 10 or a CCD sensor is located on the image forming position of the optical axis.

Figure 2:
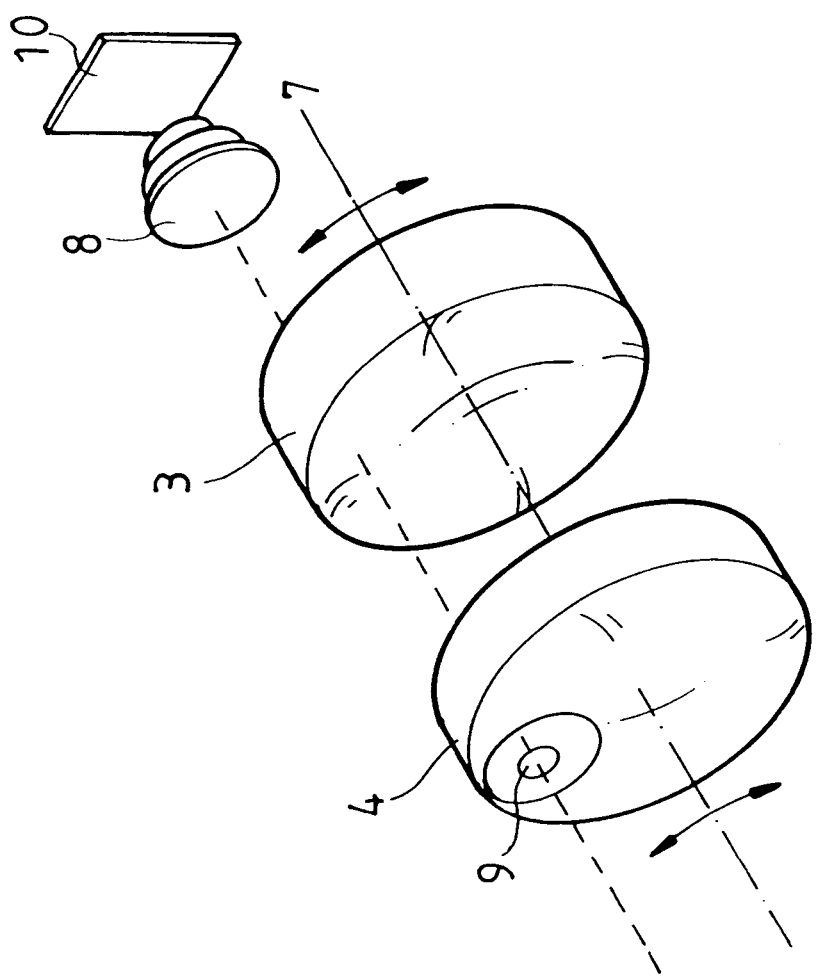
FIG. 2 is a perspective view showing a circular type zooming lens set with a fixed distance between lenses according to the present invention.

As show in FIG. 2, a rotary type zooming lens set with a fixed lens distance is disclosed. The lens set includes a circularly gradually changed curvature lens 3 and a circularly gradually changed curvature lens 4 or more lenses. The gradually changed curvature lens 3 has different curvatures along the circular position. Each curvature has a gradient changed radius of curvature. While the gradually changed curvature lens 4 has different curvatures along the circular direction with respect to the gradually changed curvature lens 3, in order to cancel the aberration of the system. In assembling it is the same as the embodiment shown in FIG. 1, the lens set is installed within a system (not shown) and two or more lenses are retained with a fix distance. In using, the gradually changed curvature lens 3 and the gradually changed curvature lens 4 rotate around the rotary axis 7, respectively, as shown by the arrows in the figure for selecting a different radius of curvature near the optical axis limited by the pupil 9 for each lens. When the gradually changed curvature lenses 3 and 4 rotate with respect to each other, they must be positioned in such a way that the corresponding local curvatures of lens 3 and lens 4 near the optical axis can cancel out the aberrations of the system and form the image of an object. The image size can be changed by rotating the lenses and changing the focus of the system with the image plane being fixed.

In order to reduce the aberration of the gradient curvature surfaces, the suitable size pupil 9 in FIG. 1 or FIG. 2 has to be used to locally limit the chosen part of the surface.

Therefore, despite of a transverse movable lens set with a fixed distance between the lenses or a rotary type lens set with a fixed distance between the lenses, by a simple design, the system can be completely matched with the zooming purpose with a fixed distance between the lenses. It is not like the traditional zoom lens system which uses an expensive precision cam. Therefore, the manufacturing cost of the system can be reduced effectively.

The basic concept and spirit of the present invention have been described in the aforementioned description. Those skilled in the art may modify or vary the aforesaid embodiments within the scope and spirit of the present intention without departing from the present invention defined in the appended claim as set forth in the following. For example, in the embodiment shown in FIG. 1, the transverse gradually changed curvature lenses 1 and 2 have curvatures varied in a vertical transverse direction in order to change the focus of the lens system. However, the (curvature of the gradually changed curvature lens may be changed in a horizontal transversal direction. In using, it is moved in leftward or rightward orientations. Moreover, in the aforesaid embodiment, a multiple of gradually changed curvature lens sets could mix with fix curvature lens sets (as the lens 8 in FIG. 1 or FIG. 2) so that when the focus of the system is changed, the image size could be changed and achieve the zooming purpose.

What is claimed is:

1. A zoom lens set comprising:

a plurality of lenses being assembled with a fixed distance between every two lenses and rotatable around a rotational axis, at least one of said lenses having a circularly gradually varying curvature; and an optical axis passing through a pupil and said plurality of lenses;

wherein a lens portion of a desired curvature from each lens of said zoom lens set is selected within said pupil along said optical axis by rotationally moving said plurality of lenses for changing focus of said zoom lens set, and said circularly gradually varying curvature has a gradient radius of curvature.

* * * * *